Aug. 14, 1923.  N. TRBOJEVICH  1,465,151
HOB
Filed Jan. 3, 1922   3 Sheets-Sheet 1

Inventor
Nikola Trbojevich

Patented Aug. 14, 1923.

1,465,151

UNITED STATES PATENT OFFICE.

NIKOLA TRBOJEVICH, OF DETROIT, MICHIGAN.

HOB.

REISSUED

Application filed January 3, 1922. Serial No. 526,512.

*To all whom it may concern:*

Be it known that I, NIKOLA TRBOJEVICH, a subject of the King of Yugoslavia, residing at Detroit, in the county of Wayne and State of Michigan, have invented certain new and useful Improvements in Hobs, of which the following is a specification, reference being had therein to the accompanying drawings.

The invention relates to the manufacture of spiral bevel gears and has for its object the obtaining of a construction of hob which is capable of generating such gears. In the present state of the art hobbing is extensively used in the manufacture of spur gears where the teeth and interdental spaces are of uniform cross-section, but such methods are not applicable to the generation of bevel gears. The difficulties encountered are; first, the changing pitch and changing tooth cross-section of a conventional bevel gear which cannot be generated by an ordinary hob; second, with spiral bevel gears, one surface of the tooth is concave and of a curvature which would preclude the use of a cylindrical hob without interference. It has been proposed to use a conical hob, but this would require a helical thread of varying lead and the mechanical difficulties in the manufacture and maintenance of such a hob are too great to render such a method practical. Furthermore, even if such hobs could be made, the gears generated thereby would be defective. I have discovered that spiral bevel gears of a novel type, and which are also my invention, can be manufactured by a hobbing process employing a hob of simple construction, which may be easily manufactured and maintained in operative condition.

Figure 1:
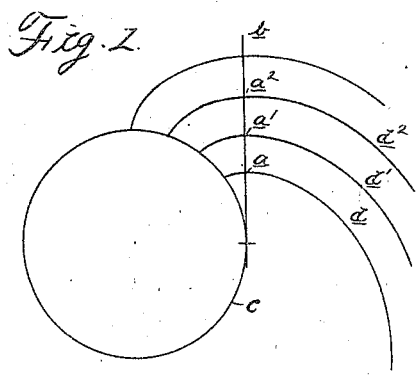
Figures 1 to 4 show diagrammatically the geometrical principles involved.
Figure 3:
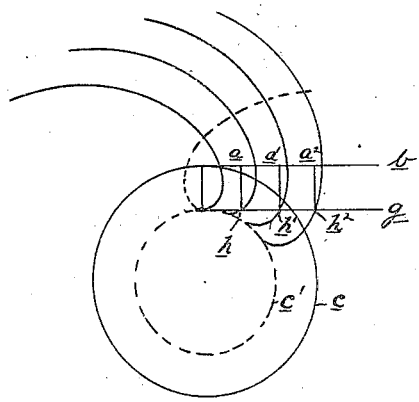
Figure 4:
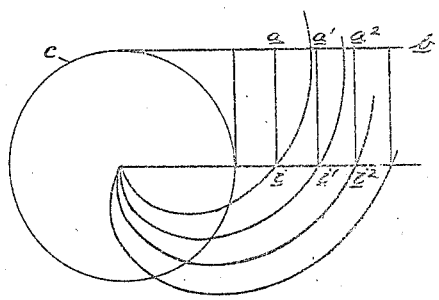

To understand my improved construction of hob, it is necessary to describe the gears which are generated thereby and the geometrical principles involved in their generation. As shown in Figure 1, $a$ is a point on a line or string $b$ which is being unwound from a base circle or drum $c$ and which traces a curve $d$ that is an involute of a circle. A series of equi-spaced points $a$, $a'$, etc. will generate similar curves, all of which are parallel to each other. If the tracing points, instead of being directly in the line $b$, are in a line $e$ offset therefrom but parallel thereto and rigid therewith, as shown at $f$, $f'$ etc. in Figure 2, such points will generate curves which are non-parallel and outwardly divergent and may be designated as extended modified involute curves. If the offsetting of the line is inward from the base circle, as shown at $g$ in Figure 3, and then the equi-spaced points $h$, $h'$ etc. thereon will also trace non-parallel outwardly divergent curves which may be termed "abridged modified involute curves." If the inward offsetting of the line is equal to the radius of the base circle, as shown in Figure 4, the curves traced by the equispaced points $i$, $i'$, etc., are true Archimedean spirals; that is, there is a constant ratio between the vectorial angle and the radius vector.

It will be seen that the curves of the three above named series are non-parallel and are outwardly divergent. It is known from geometry that involutes only (not necessarily of a circle) form series of parallel curves. In that case the generating line is a common normal to every curve of the series. However, the first named curves are not common involutes because the generating line at every instant rotates about an offset point and, therefore, is not a normal to any curve of the series. Thus, the curves are non-parallel and the distance between two consecutive curves is always less than the spacing $ff'$, $f'f^2$, etc., of the generating line $e$ Figure 2. They are also outwardly divergent because they approach a series of parallel involutes asymptotically and the normal pitch (the shortest distance between two consecutive curves) also asymptotically approaches its maximum value $ff'$.

Figure 2:
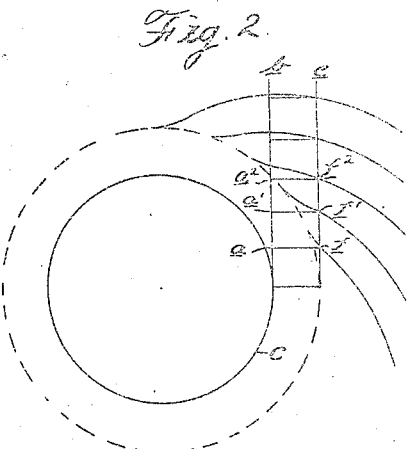
Figure 5:
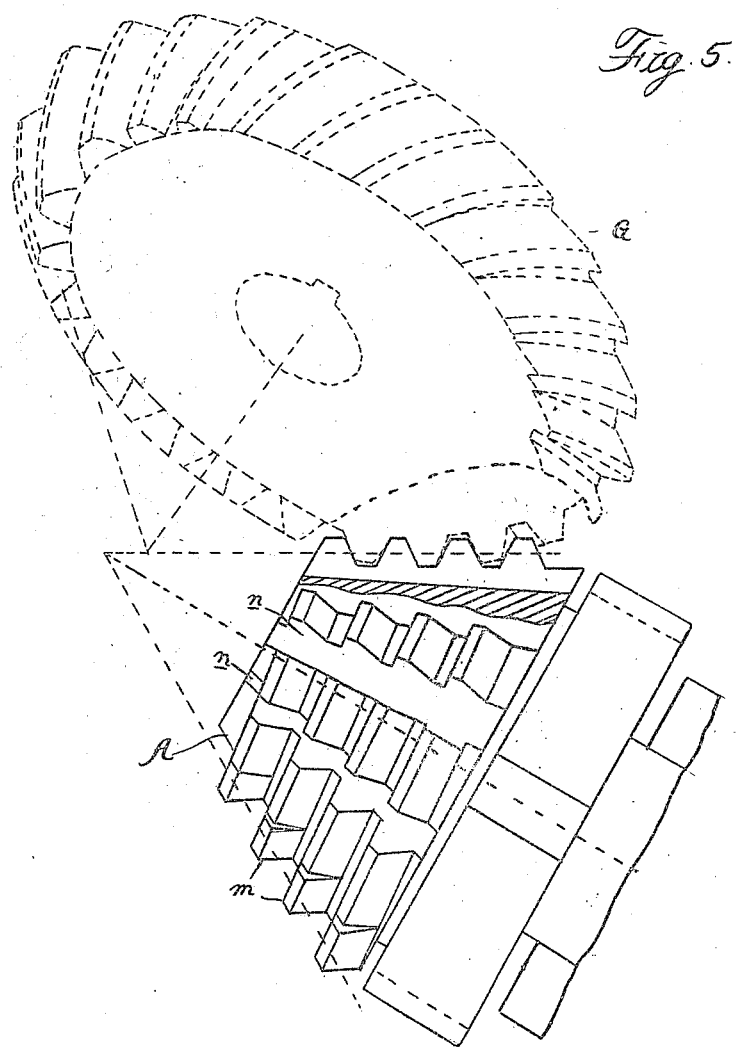
Figure 5 is a sectional elevation of the hob indicating the gear blank in dotted lines.
Figure 6:
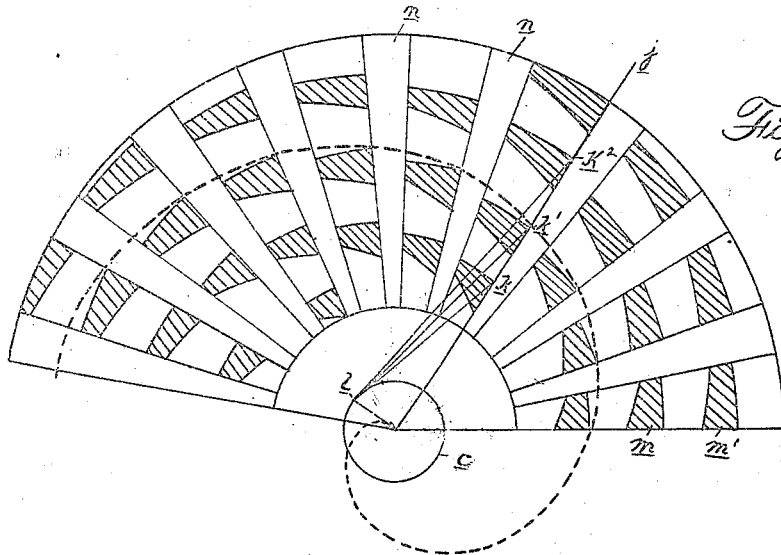
Figure 6 is the pitch cone development of a double threaded hob of the preferred form.

Figure 5 represents the side elevation of a tapering hob A meshing with a spiral gear G of the improved construction, showing that the axial section of the hob forms a rack of constant pitch and engages the gear along a geodesic line that is a conical helix which in development coincides with the offset straight line $e$ of Figure 2. Figure 6 is a development of a hob similar to that shown in Figure 5 taken in the pitch cone, all of the curves of which are Archimedean spirals. If any radial line *j* be taken and normals are drawn from the several curves at the points of intersection with the line *j*, as indicated at *k*, *k'*, etc., these normal lines will all extend to a common point 1 which point may be defined as the end of the polar subnormal belonging to the vector *j*. This is a well known property of the Archimedean spirals because those spirals are the only curves for which the length of the polar subnormal is the same for all points of the curve. Numerically, the length of the polar subnormal equals the lead of the spiral (in development) divided by $2\pi$, and is always measured perpendicular to the radius vector. Also, if the spacing of the curves in Figure 6 corresponds to the spacing of the points *i*, *i'*, etc., Figure 4, the one figure may be superimposed upon the other and both the curves and normal lines will coincide. Again, if the distance of the polar sub-normal from the radial center of Figure 6 is equal to the offsetting of the lines *e* or *g*, Figures 2 and 3, and the curves are equally spaced along said lines, then Figure 6 may be placed on either of the Figures 2 or 3 with the respective curves tangent to each other. This relation will be true for any radial line *j* and for any line *e* or *g* which is offset from the base circle a distance equal to the other polar-sub-normal.

From the geometrical principles above stated, it is evident that a tapering hob which is of constant lead and which therefore in development is an Archimedean spiral may be used for generating gear teeth of either the extended or abridged modified involute type and without interference or mutilation of one portion of the gear and the generation of another portion. It is, however, absolutely essential that the distance between the axis of the hob and its polar sub-normal should correspond with the dimension of extension or abridgment of the gear tooth, and therefore in designing the hob the dimensions are selected with this in view. It is further necessary that the cone angle of the hob should be such that the normal radius of curvature of the helicoidal face of the hob which cuts the concave side of the gear tooth should at all times be less than the normal radius of such concave face.

As specifically shown in Figure 6, the thread *m* of the hob is a double thread, but this is not essential as the hob will operate with either a single thread or a multiple thread.

The cutting edges are formed by longitudinally gashing the thread, as indicated at *n*, the number of these gashes determining the number of separate cuts that are taken in each revolution of the hob.

In computation of the polar subnormal of a certain hob only the well known mathematical rules need to be followed. The cone angle and the lead of thread in a hob (measured along the side and not along the axis of the hob), are known. From that the developed lead may be obtained as equal to the lead of the hob divided by the sine of the cone angle. By further dividing said quantity by $2\pi$, the exact value of the polar subnormal is obtained.

It is desirable that the modification of the tooth curves (preferably extended involutes) be exactly the same as the said polar subnormal. However, for practical purposes, there is considerable latitude permitted and satisfactory gears may be obtained by slightly departing from the theoretical figures. Such a departure may be advisable when the hob is larger in diameter than it would be theoretically required. In such a case a slight decrease of the modification of the tooth curves serves to compensate for the oversize hob.

While I prefer, on account of its simplicity in construction, to use a hob which in its development is an Archimedean spiral, it is possible to form a hob of other curves of the modified involute type, it being only essential to select said curve so as to be equal in extension or abridgment to the curve to be generated thereby.

Figure 7:
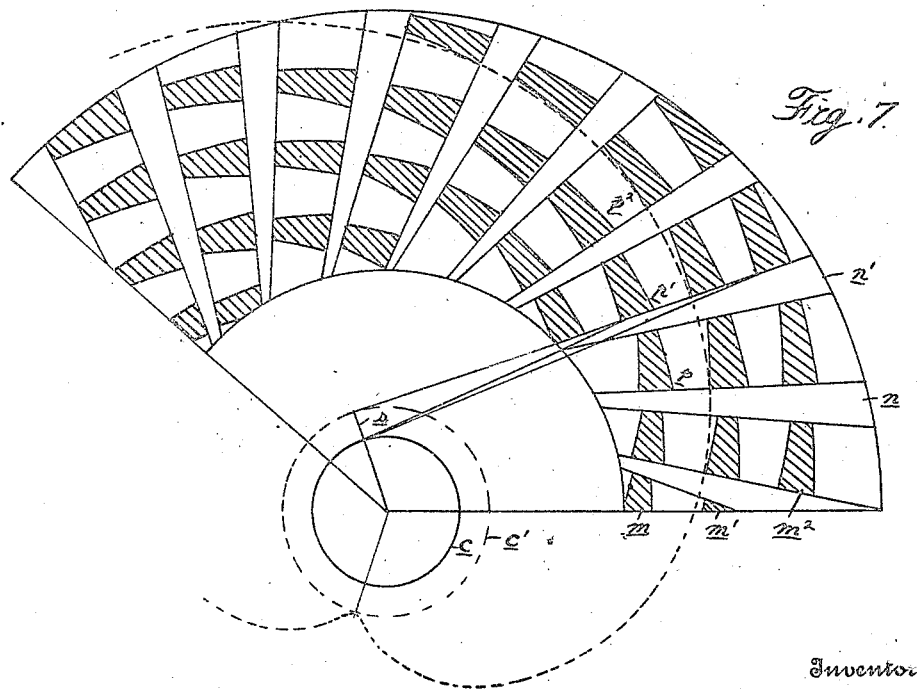
Figure 7 is a similar view of a modified construction.

In Figure 7 the pitch cone development of a hob of general involute character is shown. The cutting teeth *p*, *p'*, *p²* are arranged on the face of a truncated cone body in a series of threads *m*, *m'*, etc. which form similar extended involutes developed from the base circle *o* with the modification or offset *s*. The cutting edges are formed by a series of equally spaced gashes or flutes *n*, *n'*, etc., which are substantially perpendicular to the thread lines *m*, *m'*, etc. and may be either straight or curved. The remaining portions of the thread are relieved to form cutting edges, as will be understood. Such hobs are sharpened by grinding the faces of the flutes, similarly to the process employed for sharpening of the ordinary hobs.

What I claim as my invention is:

1. A hob or cutter for the generation of spiral bevel gears comprising a tapering helix which in development and in comparison with the development of the gear generated thereby has longitudinal tooth curves traced by points equispaced from lines rolling on the base circles respectively of the hob and gear.

2. A hob or cutter for generating spiral bevel gears comprising a tapering helix which in development is an Archimedean spiral having a polar sub-normal selected to correspond with the modification of the longitudinal tooth curves of the gear from involutes of a circle.

3. A hob or cutter for the generation of spiral bevel gears comprising a tapering helix which in geodesic section forms a rack of constant pitch and which in development forms a series of longitudinal tooth curves of modified involute form and having a predetermined relation to the longitudinal tooth curves of the gear generated thereby.

4. A hob or cutter for the generation of spiral bevel gears comprising a truncated tapering helix which in axial section forms a rack of constant pitch and which in development forms an Archimedean spiral having a polar sub-normal selected with respect to a predetermined longitudinal tooth curve of modified involute form in the gear to be generated.

5. A hob or cutter for spiral bevel gears comprising a truncated tapering helix longitudinally gashed to form cutting edges, said helix forming in the axial section of the hob a rack of constant pitch and in development forming Archimedean spiral curves having a polar sub-normal selected with reference to predetermined longitudinal tooth curves of modified involute form in the gear to be generated.

6. A hob or cutter for the generation of spiral bevel gears comprising a body having a tapering helical thread which in axial section forms a rack of constant pitch and which in development forms non-parallel modified involute curves, said curves being generated by a rack of constant pitch spaced from and parallel to a line rolling on a base circle of predetermined radius.

7. A hob or cutter comprising a tapering helix longitudinally gashed to form cutting edges, said helix forming in geodesic section a rack of constant pitch and in development forming a spiral of the general involute type.

8. A hob or cutter comprising a body having a tapering helical thread longitudinally gashed and transversely relieved to form cutting edges, said thread being capable of meshing with a rack element of constant pitch along a series of geodesic lines and forming in development a spiral of the general involute type.

9. A hob or cutter comprising a frusto-conical body provided with a tapering helical thread, which, in development, forms a spiral of the general involute type, said thread being capable of meshing with a rack element of constant pitch along a series of geodesic lines and being longitudinally gashed and transversely relieved to form cutting edges.

In testimony whereof I affix my signature.

NIKOLA TRBOJEVICH.